(12) United States Patent
Simms et al.

(10) Patent No.: US 8,870,147 B2
(45) Date of Patent: Oct. 28, 2014

(54) LOCK MECHANISM FOR SEAT TRACK

(75) Inventors: Andrew J. Simms, Royal Oak, MI (US);
David L. Robinson, Sterling Heights, MI (US)

(73) Assignee: Fisher & Company, Incorporated, St. Clair Shores, MI (US)

( * ) Notice: Subject to any disclaimer, the term of this patent is extended or adjusted under 35 U.S.C. 154(b) by 169 days.

(21) Appl. No.: 13/166,160

(22) Filed: Jun. 22, 2011

(65) Prior Publication Data
US 2011/0315847 A1    Dec. 29, 2011

Related U.S. Application Data

(60) Provisional application No. 61/359,112, filed on Jun. 28, 2010.

(51) Int. Cl.
*F16M 13/00* (2006.01)
*B60N 2/08* (2006.01)

(52) U.S. Cl.
CPC ............ *B60N 2/0893* (2013.01); *B60N 2/0818* (2013.01); *B60N 2/0875* (2013.01)
USPC ...... 248/429; 248/419; 248/424; 297/344.11; 296/65.13; 296/65.15

(58) Field of Classification Search
USPC .......................... 248/419, 424, 425, 429, 430; 296/65.13, 65.14, 65.15; 297/344.11
See application file for complete search history.

(56) References Cited

U.S. PATENT DOCUMENTS

| | | | |
|---|---|---|---|
| 5,913,947 A * | 6/1999 | Groche | 74/527 |
| 6,322,036 B1 * | 11/2001 | Tame et al. | 248/429 |
| 6,354,553 B1 * | 3/2002 | Lagerweij et al. | 248/430 |
| 6,637,712 B1 * | 10/2003 | Lagerweij | 248/429 |
| 6,892,995 B2 * | 5/2005 | Tame et al. | 248/429 |
| 7,293,752 B2 * | 11/2007 | McCulloch et al. | 248/429 |
| 7,780,138 B1 * | 8/2010 | Lee et al. | 248/429 |
| 8,029,063 B2 * | 10/2011 | Kazyak et al. | 297/344.1 |
| 8,376,460 B2 * | 2/2013 | Nadgouda et al. | 297/344.11 |
| 2006/0131470 A1 | 6/2006 | Yamada et al. | |

(Continued)

FOREIGN PATENT DOCUMENTS

| | | |
|---|---|---|
| KR | 20020055670 A | 7/2002 |
| KR | 20090131069 A | 12/2009 |
| WO | 2013/059312 A1 | 4/2013 |

OTHER PUBLICATIONS

International Search Report and Written Opinion of the International Searching Authority regarding International Application No. PCT/US2012/060605, mailed Mar. 29, 2013.

*Primary Examiner* — Nkeisha Smith
(74) *Attorney, Agent, or Firm* — Harness, Dickey & Pierce, P.L.C.

(57) ABSTRACT

A track assembly is provided and may include a track, at least one slide mechanism, and a lock mechanism. The at least one slide mechanism may be slidably attached to the track. The lock mechanism may be associated with the at least one slide mechanism and may operate between a locked state restricting movement of the at least one slide mechanism relative to the track and an unlocked state permitting movement of the at least one slide mechanism relative to the track. The lock mechanism may include a plurality of lock plates independently movable relative to one another between a first position engaging the track and a second position disengaged from the track.

14 Claims, 10 Drawing Sheets

(56) References Cited

U.S. PATENT DOCUMENTS

| | | |
|---|---|---|
| 2009/0051208 A1 | 2/2009 | Szybisty et al. |
| 2009/0230275 A1 | 9/2009 | Lawall et al. |
| 2012/0298828 A1* | 11/2012 | Wakayama et al. ........... 248/429 |

* cited by examiner

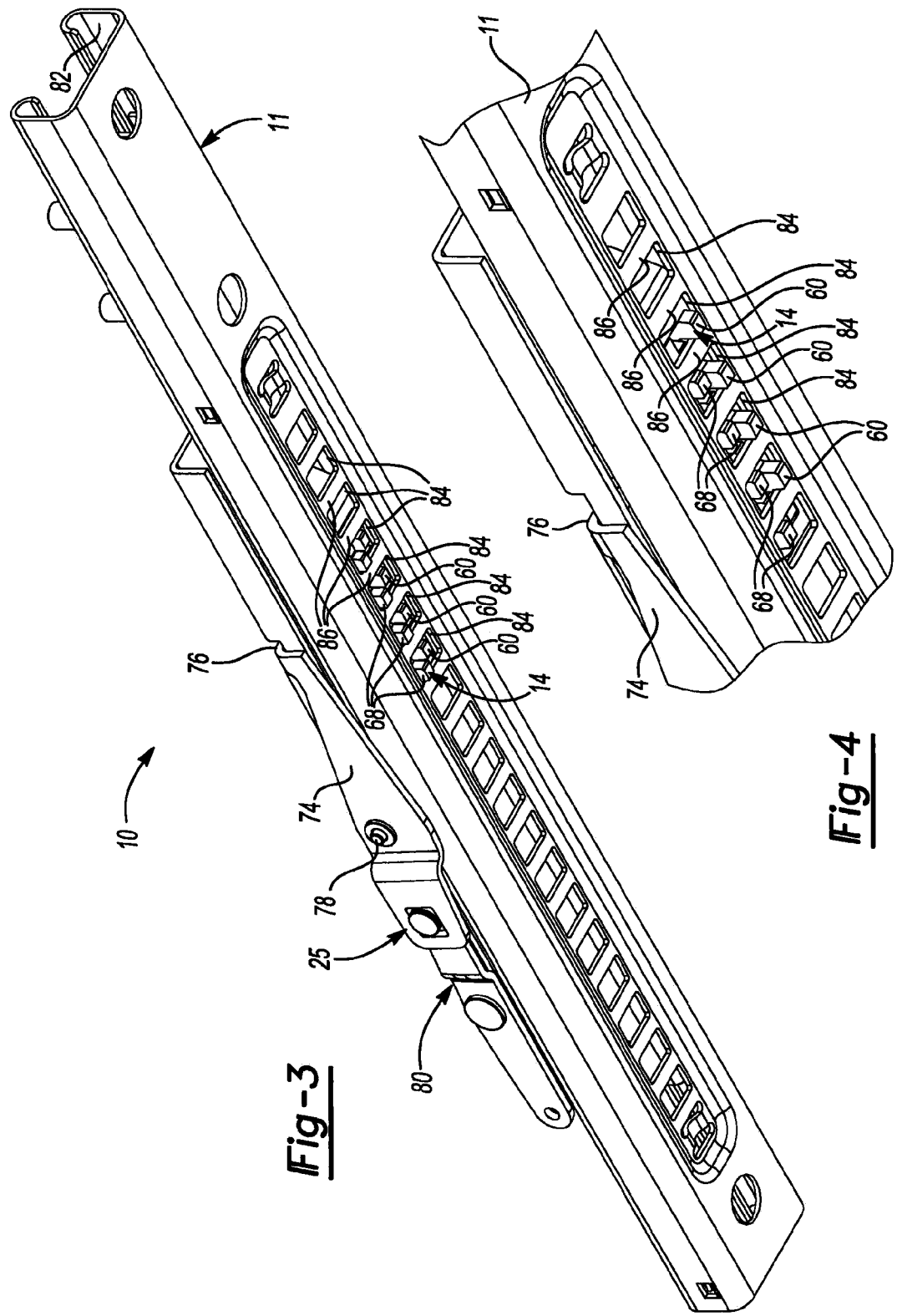

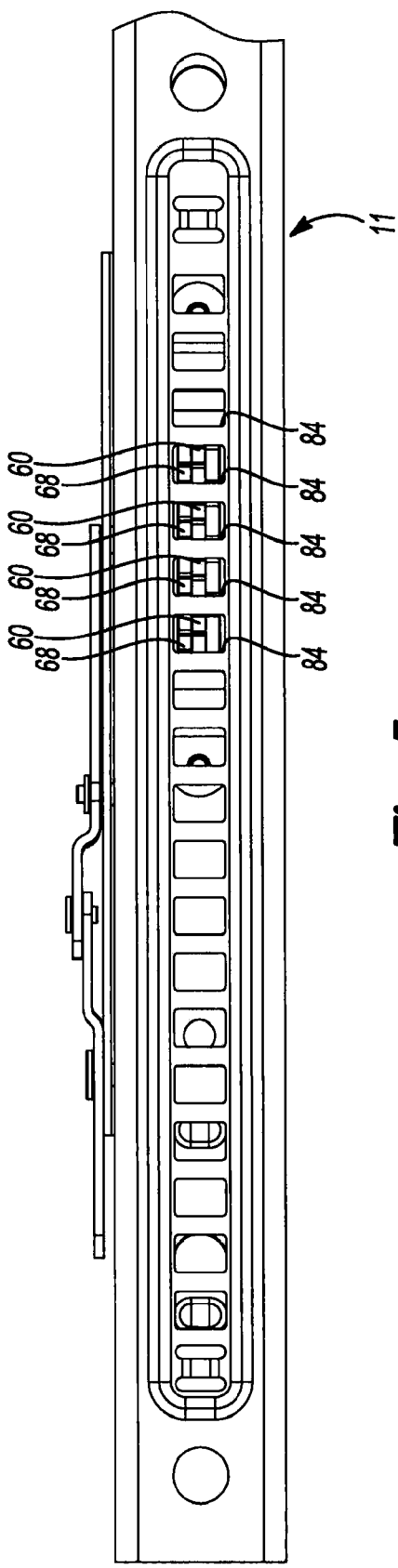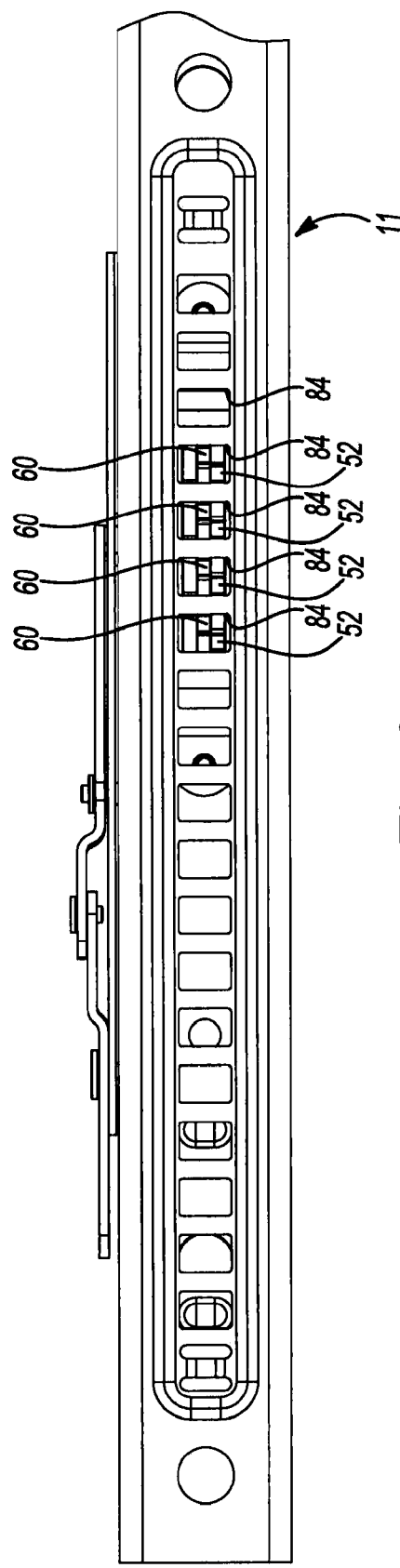

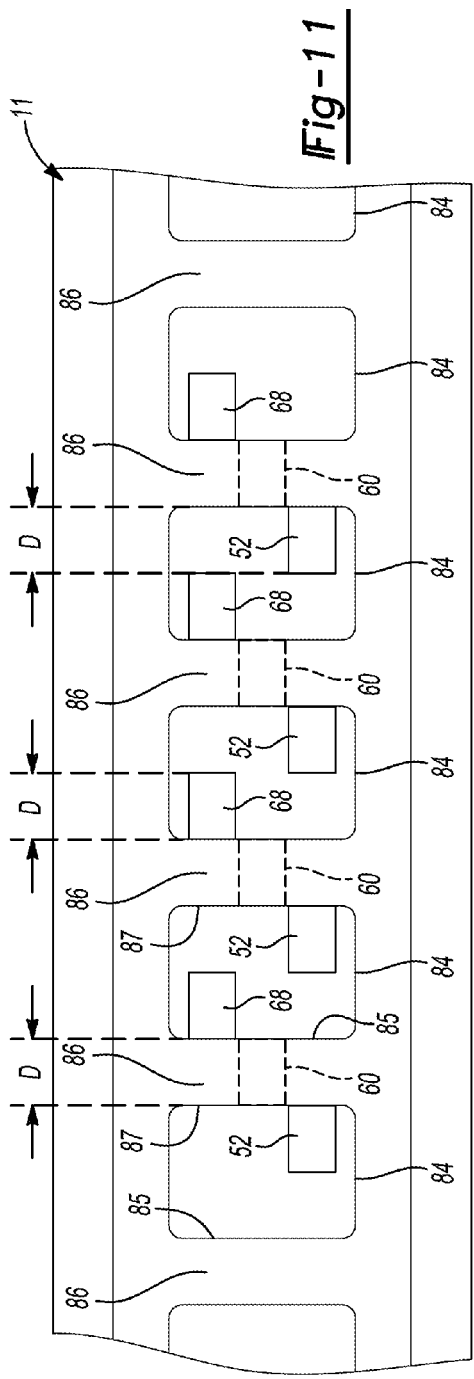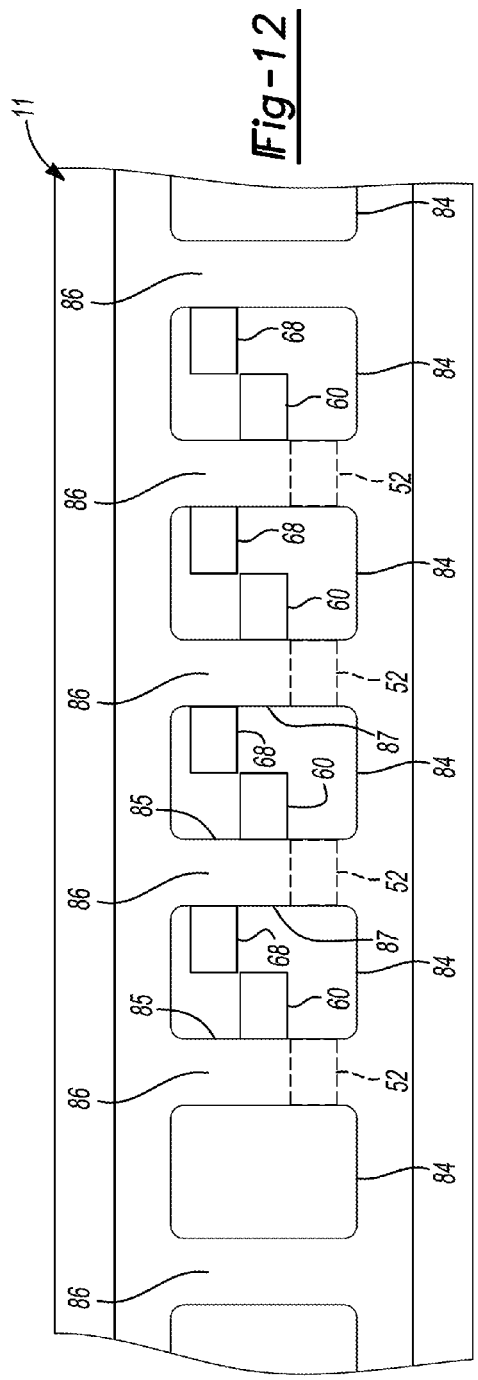

LOCK MECHANISM FOR SEAT TRACK

CROSS-REFERENCE TO RELATED APPLICATIONS

This application claims the benefit of U.S. Provisional Application No. 61/359,112, filed on Jun. 28, 2010. The entire disclosure of the above application is incorporated herein by reference.

FIELD

The present disclosure relates to a seat-track assembly and particularly to a lock mechanism for a seat-track assembly.

BACKGROUND

This section provides background information related to the present disclosure and is not necessarily prior art.

Seat assemblies such as those used in automotive vehicles typically include a series of adjustment mechanisms that allow a user to move the seat assembly relative to the vehicle. Such mechanisms allow a user to position the seat assembly into a comfortable position and/or to gain access to an area behind the seat assembly, which may contain additional rows of seating and/or a cargo compartment of the vehicle.

One such adjustment mechanism includes a series of tracks attached to the vehicle and a series of slide mechanisms attached to a seat bottom of the seat assembly. The slide mechanisms are slidably received within the tracks to allow the seat assembly to selectively move relative to the tracks and in a fore/aft direction relative to the vehicle generally towards and away from an instrument panel of the vehicle. Moving the seat assembly towards the instrument panel improves accessibility to an area behind the seat assembly while concurrently moving the seat assembly closer to the controls of the vehicle. Conversely, moving the seat assembly away from the instrument panel moves the seat assembly away from the controls of the vehicle but affords a vehicle occupant with additional space and therefore accommodates occupants of different sizes and heights.

While conventional adjustment assemblies allow fore/aft movement of a seat assembly relative to a vehicle, such adjustment assemblies do not always return to a locked state upon release of an actuation handle. For example, conventional adjustment assemblies include a pin biased into engagement with a track, whereby the pin may be received within one of a series of apertures formed in the track to positively lock a position of the seat assembly relative to the track and, thus, relative to a vehicle. When the actuation handle is actuated, the pin is disengaged from the track to permit fore/aft adjustment of the seat assembly relative to the vehicle. When the actuation handle is released, the pin is biased towards the track and will prevent movement of the seat assembly relative to the track once the pin engages an aperture of the track. However, while the pin adequately prevents movement of the seat assembly relative to the track when the pin properly seats within an aperture formed in the track, the pin may be positioned between a pair of apertures when the actuation handle is initially released and will therefore not lock the seat assembly relative to the track upon release of the actuation handle. The pin, in fact, does not lock until the seat assembly is moved either in the fore or aft direction relative to the track to allow the pin to properly engage an aperture formed in the track. Such movement of the seat assembly relative to the track is undesirable, as the seat assembly may move during use until the pin properly seats in an aperture of the track.

SUMMARY

This section provides a general summary of the disclosure, and is not a comprehensive disclosure of its full scope or all of its features.

The present disclosure provides a track assembly that may include a track, at least one slide mechanism, and a lock mechanism. The at least one slide mechanism may be slidably attached to the track. The lock mechanism may be associated with the at least one slide mechanism and may operate between a locked state restricting movement of the at least one slide mechanism relative to the track and an unlocked state permitting movement of the at least one slide mechanism relative to the track. The lock mechanism may include a plurality of lock plates independently movable relative to one another between a first position engaging the track and a second position disengaged from the track.

The present disclosure also provides an assembly that may include a track, a slide mechanism and a lock mechanism. The track may include a plurality of spaced apart apertures arranged in a substantially linear pattern. The slide mechanism may slidably engage the track. The lock mechanism may be mounted to the slide mechanism and may include first, second and third lock plates that are independently movable relative to the slide mechanism. The first lock plate may include a plurality of first posts, the second lock plate may include a plurality of second posts, and the third lock plate may include a plurality of third posts. The lock mechanism may be movable between a locked state having at least one of the first posts, the second posts, and the third posts engaging the apertures and restricting movement of the slide mechanism relative to the track when the slide mechanism is in a first position relative to the track and an unlocked state permitting movement of the slide mechanism relative to the track Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is a bottom-perspective view of the seat track and slide mechanism of FIG. 2 and a lock mechanism in a locked state;

FIG. 4 is a detailed perspective view of the seat track, the slide mechanism and the lock mechanism of FIG. 3;

FIG. 5 is a bottom view of the seat track showing the lock mechanism of FIG. 3 in a first position;

FIG. 6 is a bottom view of the seat track showing the lock mechanism of FIG. 3 in a second position;

FIG. 11 is a schematic representation of the track assembly and the lock mechanism of FIG. 1 in a first position;

FIG. 12 is a schematic representation of the track assembly and the lock mechanism of FIG. 1 in a second position;

Corresponding reference numerals indicate corresponding parts throughout the several views of the drawings.

DETAILED DESCRIPTION

Figure 1:
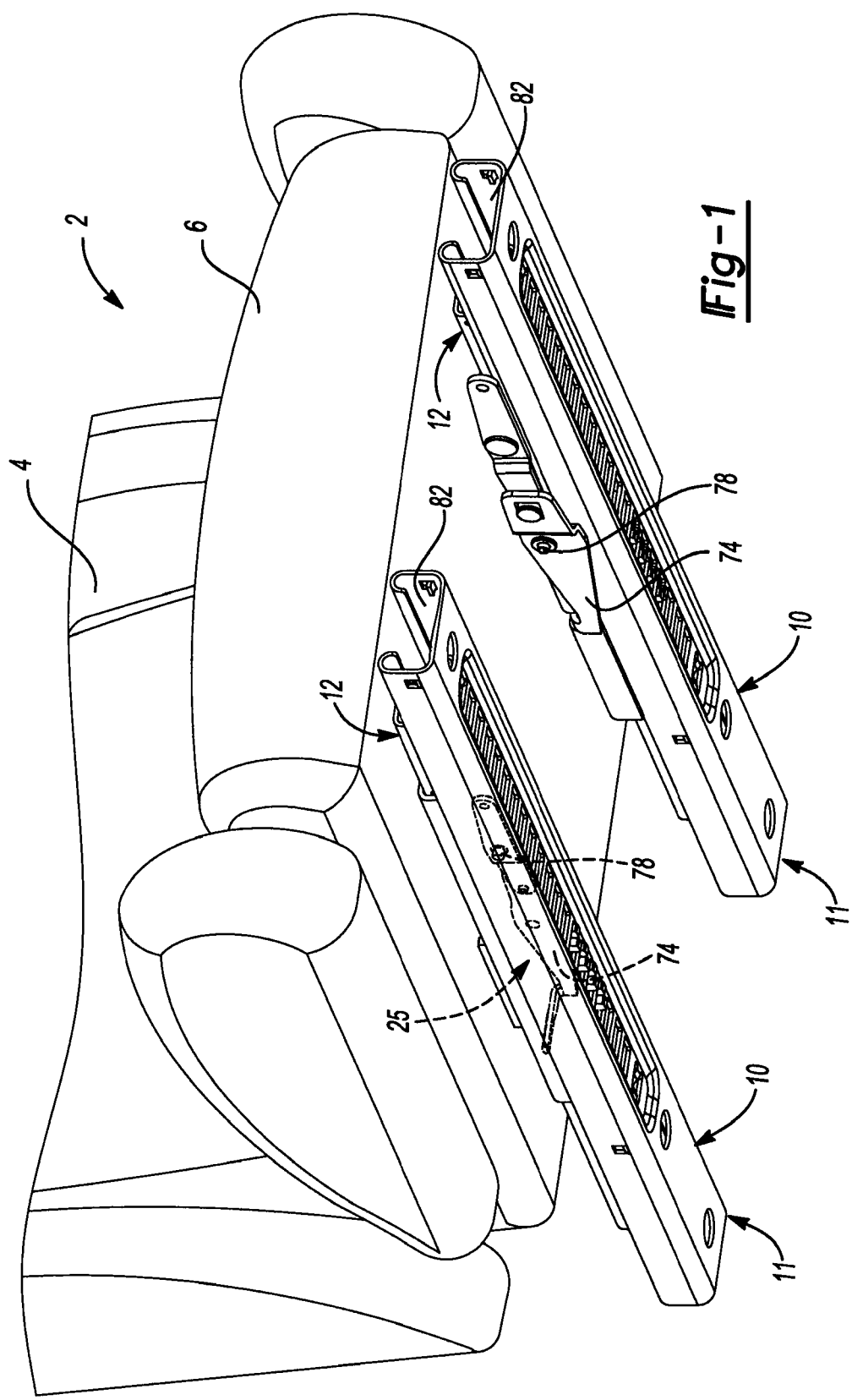
FIG. 1 is a partial perspective view of a seat assembly including a seat track and slide mechanism according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to the FIGS. 1-13, a seat assembly 2 is provided and may include a seatback 4, a seat bottom 6, and a seat-track assembly 10. The seatback 4 may be pivotably mounted to the seat bottom 6 and may be translatable along with the seat bottom 6 relative to a vehicle floorpan (not shown), for example, due to interaction with the seat-track assembly 10.

The seat assembly 2 may include a pair of seat-track assemblies 10, whereby each assembly 10 includes a track 11, a slide mechanism 12, and at least one lock mechanism 14. The tracks 11 may be fixed to a structure such as a vehicle floorpan or other external structure (neither shown), for example. The slide mechanisms 12 may be translatable relative to the tracks 11, may be mounted to the seat bottom 6 (FIG. 1), and may be slidably disposed within a corresponding one of the tracks 11.

A lock mechanism 14 may be mounted to one or more of the slide mechanisms 12 and may be movable between a locked state and an unlocked state to selectively lock the slide mechanisms 12 and, thus, the seatback 4 and seat bottom 6, relative to the track 11. For example, in one configuration, each of the slide mechanisms 12 may include a lock mechanism 14. In another configuration, only one of the slide mechanisms 12 of each track 11 includes a lock mechanism 14.

With reference to FIGS. 2 and 7-10, the lock mechanism 14 is shown to include a first lock plate 16, a second lock plate 18, a third lock plate 20, a bracket 22, a housing 24, and an actuation mechanism 25. The bracket 22 may be attached to the slide mechanism 12 and/or a bottom surface of the seat bottom 6 via one or more welds, threaded fasteners, and/or rivets, for example. The housing 24 may cooperate with the bracket 22 to position at least a portion of each of the first lock plate 16, second lock plate 18, and third lock plate 20 generally between the bracket 22 and the housing 24.

The bracket 22 may include apertures 26 that receive fasteners (not shown) to attach the bracket 22 and, thus, the lock mechanism 14, to the slide mechanism 12 and/or seat bottom 6. The bracket 22 may additionally include a recess 28 having an opening 29 (FIG. 10) receiving at least a portion of the first lock plate 16, second lock plate 18, and third lock plate 20 therein.

Figure 7:
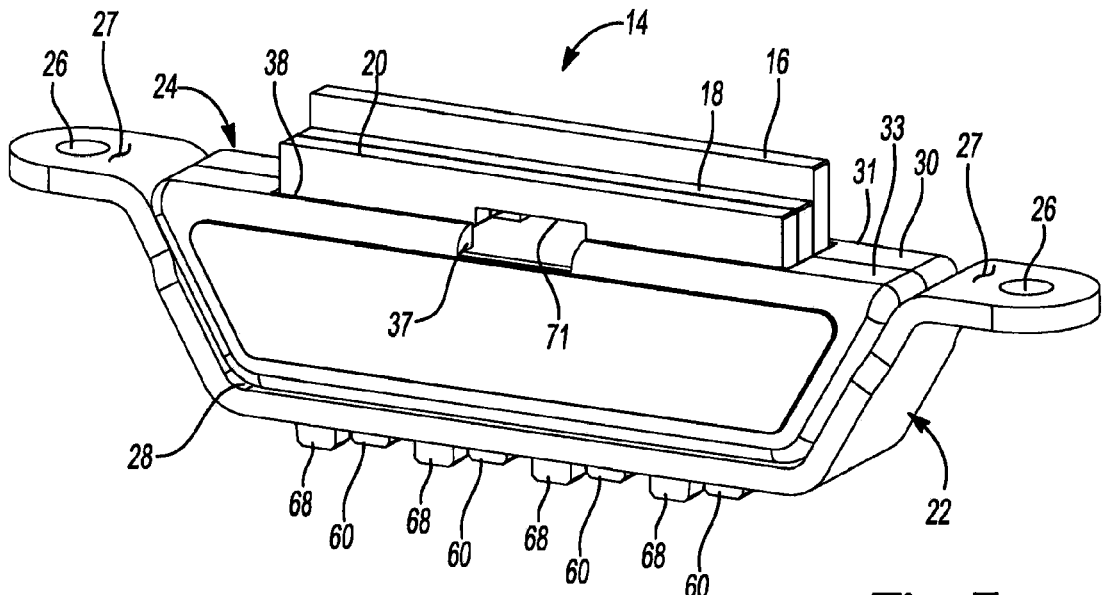
FIG. 7 is a perspective view of the lock mechanism of FIG. 3.
Figure 8:
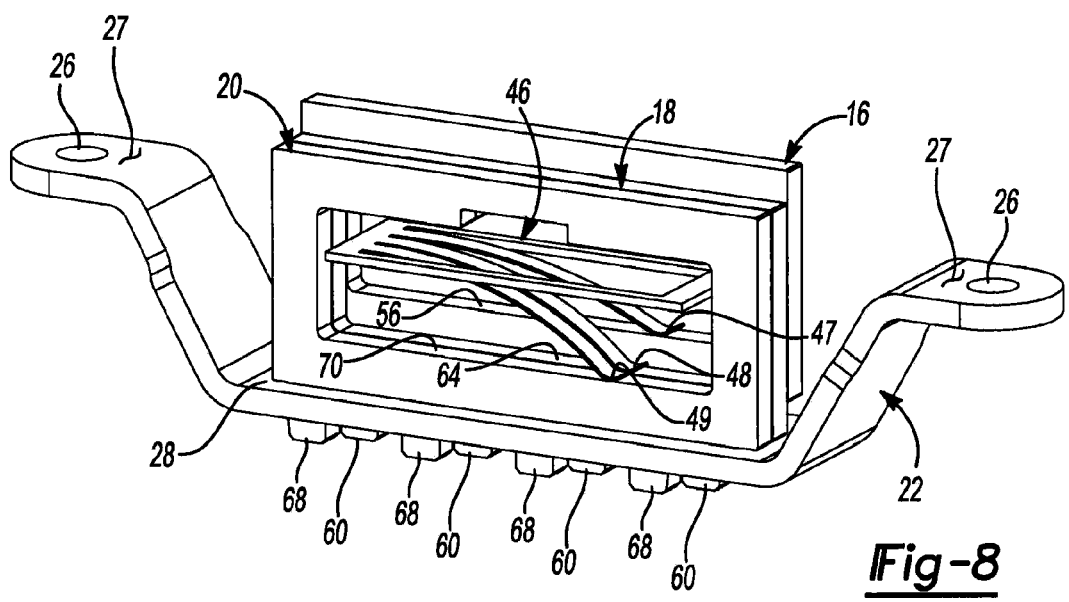
FIG. 8 is a perspective view of the lock mechanism of FIG. 7 with a housing removed to show internal components of the lock mechanism.

The housing 24 may be at least partially disposed within the recess 28 and may include a width substantially equal to a width of the recess 28 and a height substantially equal to a height of the recess 28. Once assembled, a top portion 30 of the housing 24 may be substantially flush with a surface 27 of the bracket 22 generally proximate to the apertures 26 (FIGS. 7 and 8).

Figure 9:
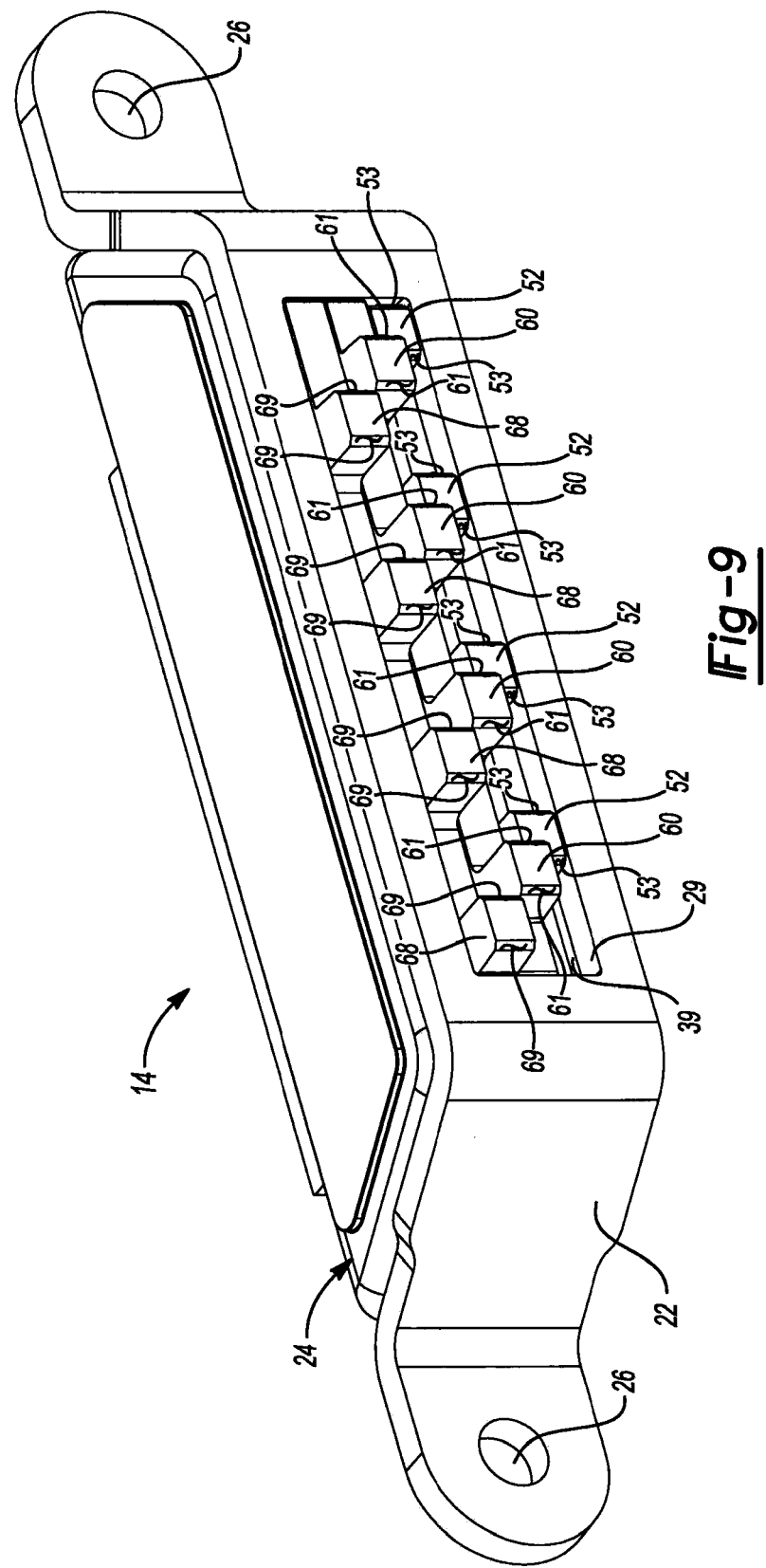
FIG. 9 is perspective view of the lock mechanism of FIG. 3.
Figure 10:
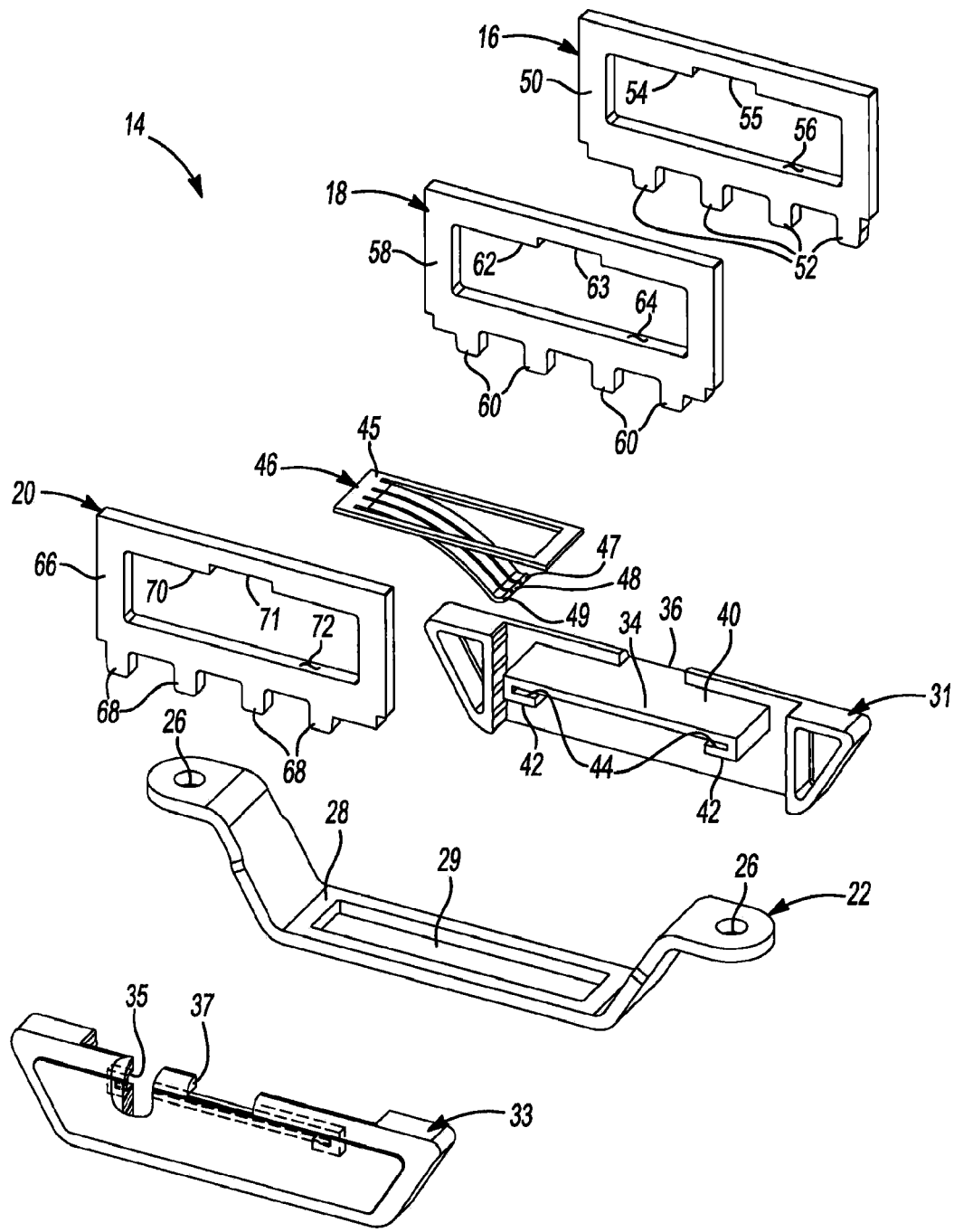
FIG. 10 is an exploded perspective view of the lock mechanism of FIG. 3.

The housing 24 may include a first portion 31 and a second portion 33 that may cooperate to at least partially encase the first, second and third lock plates 16, 18, 20. The first portion 31 may include a guide member 34 that extends between the first and second portions 31, 33 and is matingly received within a slot 35 formed in the second portion 33 (FIG. 10). The guide member 34 may be retained within the slot 35 by a press fit, a snap fit, an adhesive bond, one or more fasteners, and/or any other suitable method. The first and second portions 31, 33 may include first and second cutouts 36, 37, respectively, and may cooperate to form first and second openings 38, 39 through which portions of the first, second and third lock plates 16, 18, 20 may extend (FIGS. 7 and 9).

The guide member 34 may include a main body 40 and one or more shelves 42 forming slots 44. A frame 45 of a biasing assembly 46 may be received in the slots 44 between the shelves 42 and the main body 40 to retain the biasing assembly 46 within the housing 24 and between the first and second portions 31, 33. The biasing assembly 46 may include first, second and third biasing members 47, 48, 49 attached at one end to the frame 45 that generally correspond to the first, second and third lock plates 16, 18, 20, respectively. While the first, second and third biasing members 47, 48, 49 are depicted in FIGS. 8 and 10 as leaf springs, the first, second and third biasing members 47, 48, 49 could be any other type of spring or biasing member such as, for example, coil springs acting between the main body 40 and respective ones of the first, second, and third lock plates 16, 18, 20.

The first lock plate 16 may include a main body 50, a series of lock posts 52, and an opening 54 extending through the main body 50. The main body 50 may be at least partially disposed between the bracket 22 and the housing 24 generally within the recess 28 of the bracket 22. The lock posts 52 may be spaced apart from each other and substantially aligned with each other along a longitudinal axis of the main body 50. The lock posts 52 may extend from the main body 50 through the second opening 39 in the housing 24 (FIG. 9) and may include a pair of tapered surfaces 53. The opening 54 may include cutout 55 that may be aligned with the cutouts 36, 37 in the first and second portions 31, 33 of the housing 24. The guide member 34 may extend through and slidably engage the opening 54 to allow the first lock plate 16 to move upward and downward (relative to the views shown in FIGS. 7 and 8) through the first and second openings 38, 39 in the housing 24. The first biasing member 47 may engage a surface 56 that partially defines the opening 54 and may bias the first lock plate 16 downward (relative to the views shown in FIGS. 7 and 8).

The second lock plate 18 may include a main body 58, a series of lock posts 60, and an opening 62 extending through the main body 58. The main body 58 may be at least partially disposed between the bracket 22 and the housing 24 generally within the recess 28 of the bracket 22. The lock posts 60 may be spaced apart from each other and substantially aligned with each other along a longitudinal axis of the main body 58. The lock posts 60 may extend from the main body 58 through the second opening 39 in the housing 24 (FIG. 9), may include a pair of tapered surfaces 61, and may be misaligned or staggered relative to the lock posts 52 of the first lock plate 16 once assembled to the housing 24. The opening 62 may include cutout 63 that may be aligned with the cutout 55 of the first lock plate 16 and the cutouts 36, 37 in the first and second portions 31, 33 of the housing 24. The guide member 34 may extend through and slidably engage the opening 62 to allow the second lock plate 18 to move upward and downward (relative to the views shown in FIGS. 7 and 8) through the first and second openings 38, 39 in the housing 24. The second biasing member 48 may engage a surface 64 that partially defines the opening 62 and may bias the second lock plate 18 downward (relative to the views shown in FIGS. 7 and 8).

The third lock plate 20 may include a main body 66, a series of lock posts 68, and an opening 70 extending through the main body 66. The main body 66 may be at least partially disposed between the bracket 22 and the housing 24 generally within the recess 28 of the bracket 22. The lock posts 68 may be spaced apart from each other and substantially aligned with each other along a longitudinal axis of the main body 66. The lock posts 68 may extend from the main body 66 through the second opening 39 in the housing 24 (FIG. 9), may include a pair of tapered surfaces 69, and may be misaligned or staggered relative to the lock posts 52, 60 of the first and second lock plates 16, 18, respectively, once assembled to the housing 24. The opening 70 may include cutout 71 that may be aligned with the cutouts 55, 63 of the first and second lock plates 16, 18 and the cutouts 36, 37 in the first and second portions 31, 33 of the housing 24. The guide member 34 may extend through and slidably engage the opening 70 to allow the third lock plate 20 to move upward and downward (relative to the views shown in FIGS. 7 and 8) through the first and second openings 38, 39 in the housing 24. The third biasing member 49 may engage a surface 72 that partially defines the opening 70 and may bias the third lock plate 20 downward (relative to the views shown in FIGS. 7 and 8).

Figure 2:
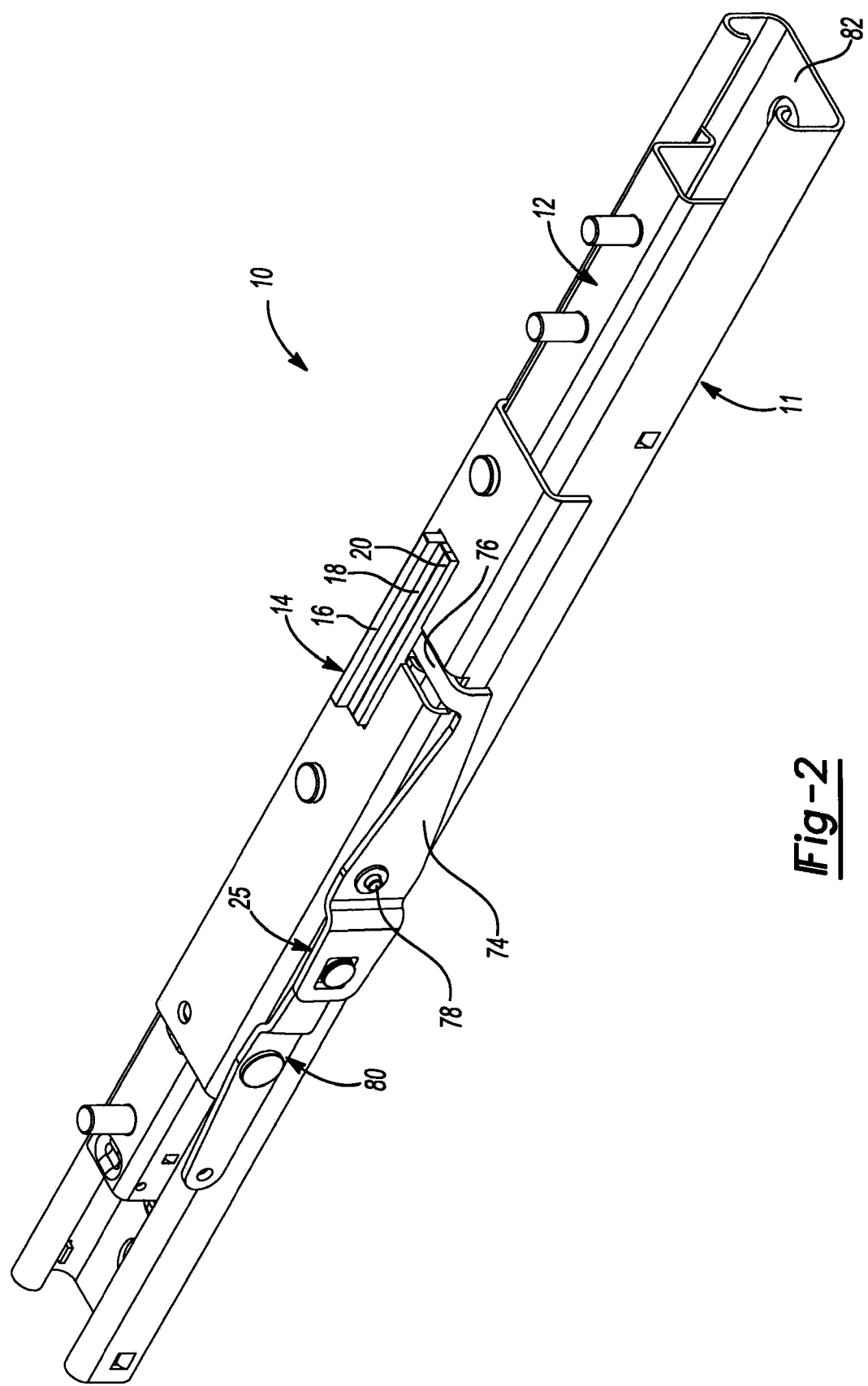
FIG. 2 is a top-perspective view of the seat track and slide mechanism of FIG. 1.

The actuation mechanism 25 may include a lever 74 having an arm 76 extending therefrom (FIG. 2). The arm 76 may extend through one or both of the cutouts 36, 37 in the housing 24 and may engage the cutouts 55, 63, 71 of the first, second and third lock plates 16, 18, 20, respectively. The lever 74 may be rotatable relative to the slide mechanism 12 about a pivot 78. The lever 74 may be connected to any suitable linkage or mechanism 80 that allows a user to rotate the lever 74 about the pivot 78 which, in turn, causes the arm 76 to lift the first, second and third lock plates 16, 18, 20 upward (relative to the views shown in FIGS. 2 and 7) against the biasing force of the biasing members 47, 48, 49.

With continued reference to FIGS. 1-13, operation of the seat-track assembly 10 will be described in detail. The slide mechanisms 12 may be slidably disposed within an opening 82 in the track 11 of the seat-track assembly 10. As such, because the slide mechanisms 12 may be fixedly attached to the seat bottom 6, the slide mechanisms 12 may slidably support the seatback 4 and seat bottom 6 relative to the track 11. The track 11 may additionally include a series of apertures 84 having a series of webs 86 respectively disposed between adjacent apertures 84.

The lock mechanism 14 may be moved between a locked state and an unlocked state, whereby the slide mechanisms 12 are permitted to move relative to the track 11 when the lock mechanism 14 is in the unlocked state and are restricted from moving relative to the track 11 when the lock mechanism 14 is in the locked state. Because the seat bottom 6 is attached for movement with the slide mechanisms 12, when the lock mechanism 14 is in the unlocked state, the seatback 4 and seat bottom 6 may be moved (i.e., translated) relative to the track 11 and are restricted from moving relative to the track 11 when the lock mechanism 14 is in the locked state.

The lock mechanism 14 may initially be in the locked state, whereby two of the first lock plate 16, second lock plate 18, and third lock plate 20 are engaged with the track 11. Specifically, the lock posts 52 of the first lock plate 16 may be received within respective ones of the apertures 84 of the track 11 while the lock posts 60 of the second lock plate 18 are similarly received within respective apertures 84 of the track 11. While the lock posts 52 of the first lock plate 16 and the lock posts 60 of the second lock plate 18 are described as being received within the apertures 84 of the track 11, any combination of the lock posts 52, 60, 68 of the first lock plate 16, second lock plate 18, and third lock plate 20 may be disposed within the apertures 84 of the track 11 to place the lock mechanism 14 in the locked state and prevent movement of the slide mechanisms 12 relative to the track 11. For example, the second and third lock plates 18, 20 are shown in FIG. 7 as being in an engaged position (i.e., a position in which the lock posts 60, 68 of the second and third lock plates 18, 20, respectively, may engage apertures 84) and the first lock plate 16 is shown in FIG. 7 in a disengaged position (i.e., a position in which the lock posts 52 of the first lock plate 16 do not engage the apertures 84).

Figure 13:
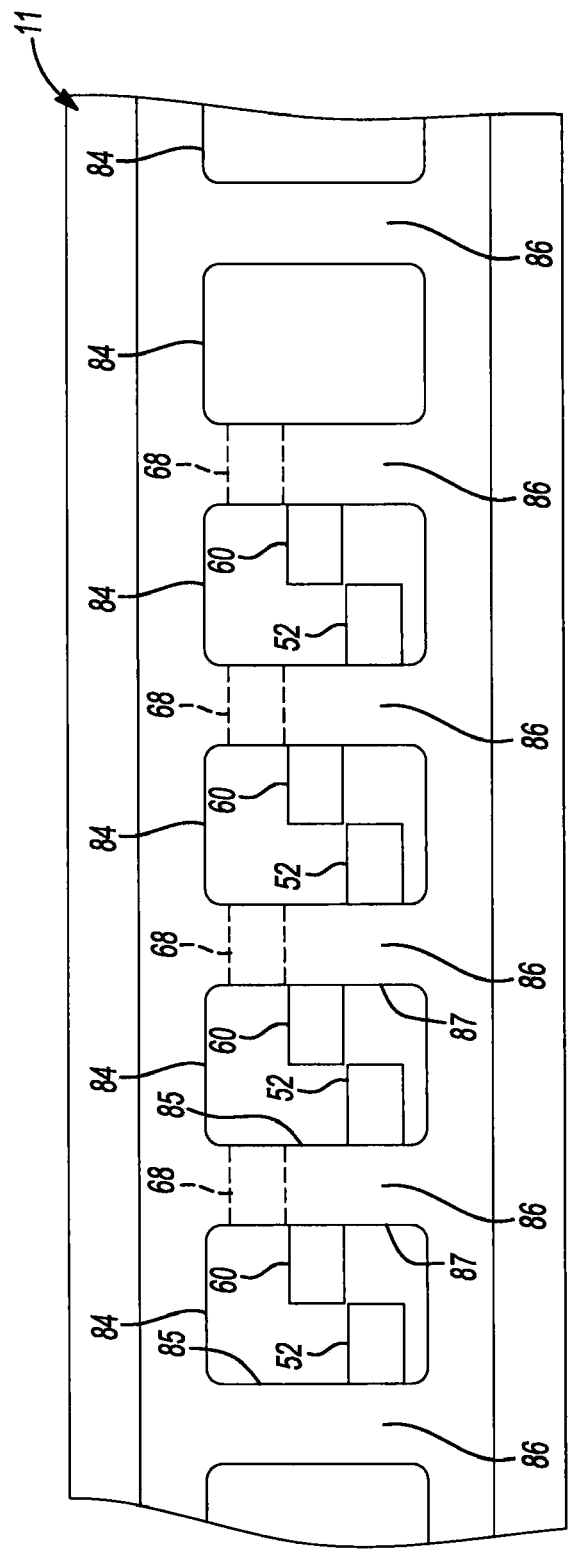
FIG. 13 is a schematic representation of the track assembly and the lock mechanism of FIG. 1 in a third position.

The particular combination of lock plates 16, 18, 20 and associated lock posts 52, 60, 68 extending into apertures 84 of the track 11 is determined based on the position of the slide mechanisms 12 relative to the apertures 84 of the track 11. For example, as shown in FIG. 11, the slide mechanism 12 is positioned relative to the track 11 such that the lock posts 52 of the first lock plate 16 and the lock posts 68 of the third lock plate 20 are disposed in and engage apertures 84 of the track 11. The lock posts 52, 68 are moved into the apertures 84 when the user releases the actuation mechanism 25 due to the biasing members 47, 49 respectively exerting a force on the first lock plate 16 and third lock plate 20 such that the lock posts 52, 68 are urged towards the track 11 and into the apertures 84. Movement of the lock posts 52, 68 into the apertures 84 may be facilitated by the respective tapered edges 53, 69 of each lock post 52, 68. Further, each of the lock posts 52, 60, 68 include a smaller size than the size of each aperture 84 such that a pair of lock posts 52, 60, 68 can occupy the same aperture 84 at the same time. FIGS. 11-13 illustrate the various combinations of posts 52, 60, 68 that may engage apertures 84 of track 11 to position the lock mechanism 14 in the locked state in any given position of the slide mechanism 12 relative to the track 11.

As described above, a user may apply a force to the mechanism 80 to move the arm 76, and therefore, move the first lock plate 16, second lock plate 18, and third lock plate 20 into the disengaged positions against the force imparted on each lock plate 16, 18, 20 by the respective biasing members 47, 48, 49. Such movement causes the particular combination of lock posts 52, 60, 68 to move out of engagement with the apertures 84, thereby moving the lock mechanism 14 into the unlocked state. Moving the lock mechanism 14 into the unlocked state permits the slide mechanisms 12 and, thus, the seat assembly 2, to move relative to the track 11. Once a desired position of the slide mechanisms 12 and seat assembly 2 relative to the track 11 is obtained, the force applied to the mechanism 80 may be released, whereby at least one of the first lock plate 16, second lock plate 18, and third lock plate 20 are allowed to drop back into the apertures 84 of the track 11 (i.e., into the engaged positions) to prevent further movement of the slide mechanism 12 relative to the track 11.

Because the first lock plate 16, second lock plate 18, and third lock plate 20 are independently movable relative to one another and, further, because the series of lock posts 52, 60, 68 are staggered relative to one another, at least one of the series of lock posts 52, 60, 68 of the first lock plate 16, second lock plate 18, and third lock plate 20 will be aligned with the apertures 84 of the track 11 upon release of the actuation mechanism 25 to allow the lock posts 52, 60, 68 to engage the apertures 84 and restrict movement of the slide mechanisms 12 and, thus, the seat assembly relative to the track 11.

In some configurations, the offsets between the lock posts 52, 60, 68 of the first lock plate 16, second lock plate 18, and third lock plate 20 may be approximately equal to five millimeters. For example, the posts 52 of the first lock plate 16 may be offset in a direction extending along a longitudinal axis of the track 11 relative to the posts 60 of the second lock plate 18 by an amount equal to a dimension (D) of each of the posts 52, 60, 68 of the respective lock plates 16, 18, 20. Similarly, the posts 60 of the second lock plate 18 may be offset in the direction extending along the longitudinal axis of track 11 relative to the posts 68 of the third lock plate 20 by an amount equal to the dimension (D) of each of the posts 52, 60, 68 of the respective lock plates 16, 18, 20. As such, when the actuation mechanism 25 is initially released and the biasing members 47, 48, 49 are permitted to once again move the first lock plate 16, second lock plate 18, and third lock plate 20 toward the apertures 84 of the track 11, thereby allowing one of the series of lock posts 52, 60, 68 to engage the apertures 84 of the track 11, movement of the seat bottom 6 and slide mechanisms 12 in either a fore or aft direction relative to the vehicle equaling approximately five millimeters will cause the lock posts 52, 60, 68 of one of the other lock plates 16, 18, 20 that was not initially engaged with apertures 84 of the track 11 to move into engagement with the apertures 84 of the track 11 to further prevent movement of the slide mechanisms 12 and seat bottom 6 relative to the track 11. As shown in FIGS. 11-13, when two of the series of lock posts 52, 60, 68 (i.e., posts 52 and 68 in FIG. 11) are engaged with apertures 84 of the track 11, the remaining series of lock posts 52, 60, 68 (i.e., post 60 in FIG. 11) may be generally aligned with the webs 86 between the apertures 84, and therefore, may be prevented from dropping down into engagement with the apertures 84.

Offsetting the lock posts 52, 60, 68 of the lock plates 16, 18, 20 once assembled to the housing 24 allows the lock posts 52, 60, 68 engaged within the same apertures 84 of the track 11 (e.g., the lock posts 52 of the first lock plate 16 and the lock posts 60 of the second lock plate 18, as shown in FIG. 13) to contact opposite sides of the aperture 84. For example, in the position shown in FIG. 13, the lock posts 52 of the first lock plate 16 contact a first side or edge 85 of the apertures 84 and the lock posts 60 of the second lock plate 18 contact an opposite side or edge 87 of the apertures 84. Allowing the lock posts 52 of the first lock plate 16 to contact the first edge 85 of the apertures 84 and allowing the lock posts 60 of the second lock plate 18 to contact the opposite edge 87 of the apertures 84 restricts even slight movement of the slide mechanisms 12 and seat assembly 2 relative to the track 11, thereby reducing "chuck" and minimizing noise caused by vibration of the seat assembly 2 and vehicle during use.

As described, the lock posts 52, 60, 68 of the respective lock plates 16, 18, 20 may occupy particular portions of the apertures 84 or may be aligned with the webs 86 depending on the particular position of the slide mechanism 12 relative to the track 11. FIGS. 11-13 provide schematic representations of three different positions of the slide mechanism 12 relative to the track 11 with three different combinations of lock posts 52, 60, 68 received within apertures 84 of the track 11. For example, as shown in FIG. 11, lock posts 52 and 68 of the first and third lock plates 16, 20 are received within apertures 84 of the track 11. In this position, five apertures 84 of the track 11 receive lock posts 52, 68 with three of five apertures 84 receiving a pair of lock posts 52, 68, and the other two of the five apertures 84 receiving a single lock post 52, 68, respectively. In the position shown in FIG. 11, the lock posts 60 of the second lock plate 18 are misaligned with the apertures 84, and therefore, may rest on the webs 86 between the apertures 84 instead of extending through the apertures 84.

As shown in FIG. 12, in another position of the slide mechanism 12 relative to the track 11, lock posts 60 and 68 of the second and third lock plates 18, 20 are received within apertures 84 of the track 11. Four apertures 84 of the track 11 may receive lock posts 60, 68. In this position, the lock posts 52 of the first lock plate 16 are misaligned with the apertures 84, and therefore, may rest on the webs 86 between the apertures 84 instead of extending through the apertures 84.

As shown in FIG. 13, in yet another position of the slide mechanism 12 relative to the track 11, lock posts 52 and 60 of the first and second lock plates 16, 18 are received within apertures 84 of the track 11. Four apertures 84 of the track 11 may receive lock posts 52, 60. In the position shown in FIG. 13, the lock posts 68 of the third lock plate 20 are misaligned with the apertures 84, and therefore, may rest on the webs 86 between the apertures 84 instead of extending through the apertures 84.

While the lock plates 16, 18, 20 are described above as each having four lock posts 52, 60, 68, in other configurations, the lock plates 16, 18, 20 may include any number of lock posts 52, 60, 68. Additionally or alternatively, the spacing between adjacent lock posts could be increased relative to the spacing shown in the figures and/or the relative positioning of the lock plates 16, 18, 20 relative to each other could be modified such that more of the apertures 84 receive only a single one of the lock posts 52, 60, 68 in one or more of the positions of the slide mechanism 12 described above.

Figure 14:
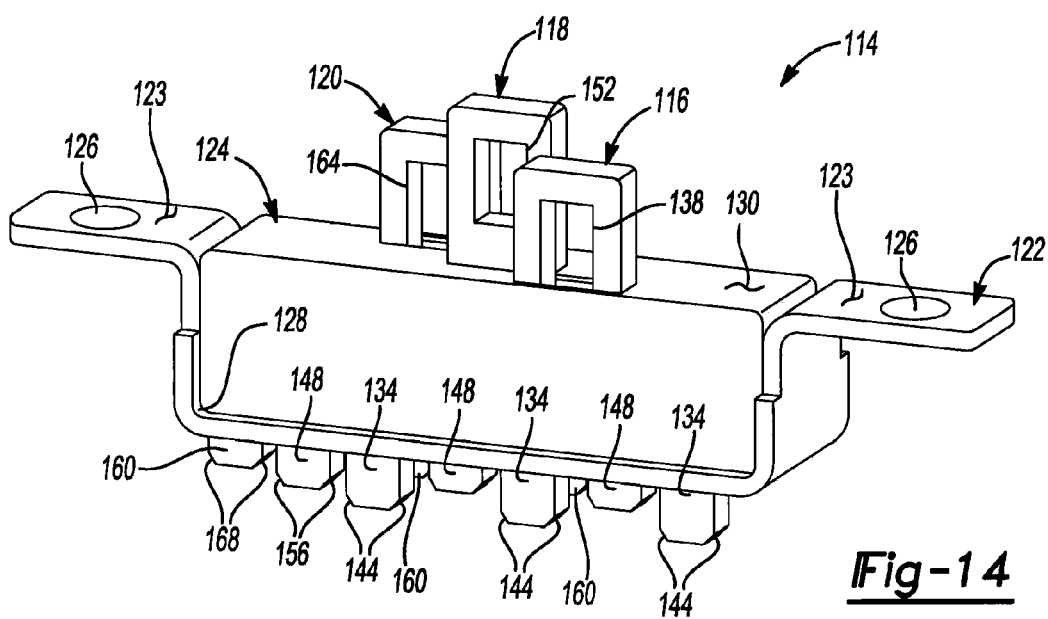
FIG. 14 is a perspective view of a lock mechanism in accordance with the principles of the present disclosure.
Figure 15:
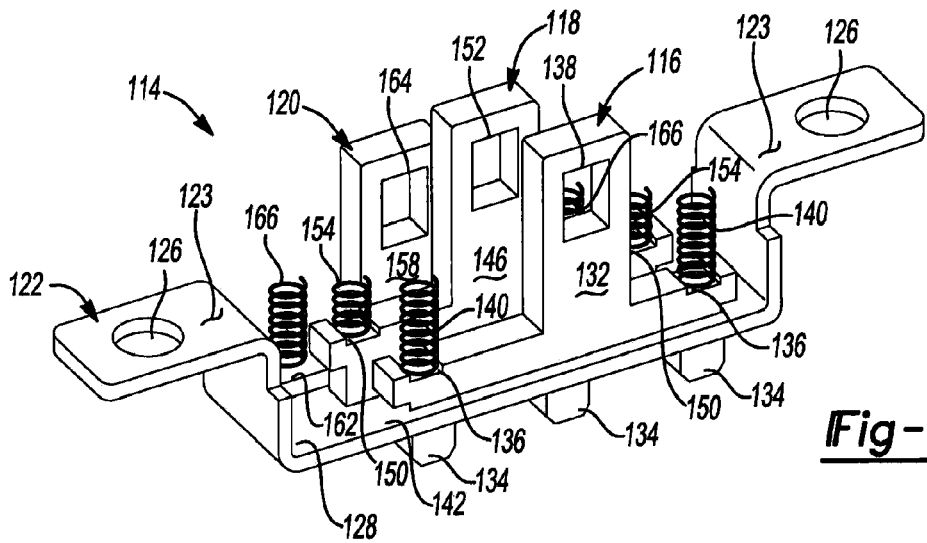
FIG. 15 is a perspective view of the lock mechanism of FIG. 14 with a housing removed to show internal components of the lock mechanism.

Referring now to FIGS. 14 and 15, another lock mechanism 114 is provided. The lock mechanism 114 may be incorporated into the seat-track assembly 10 described above in addition to or as an alternative to the lock mechanism 14. The function of the lock mechanism 114 may be generally similar to that of the lock mechanism 114. That is, the lock mechanisms 114 may be movable between a locked state and an unlocked state to respectively restrict and allow movement of the slide mechanisms 12 relative to the tracks 11.

The lock mechanism 114 may include first, second and third lock plates 116, 118, 120, a bracket 122, and a housing 124. Bracket 122 may be generally similar to the bracket 22 described above, and therefore, will not be described again in detail. The housing 124 may be at least partially disposed within a recess 128 of the bracket 122 and may include a width substantially equal to a width of the recess 128 and a height substantially equal to a height of the recess 128. As such, a top surface 130 of the housing 124 may be substantially flush with a surface 123 of the bracket 122 generally proximate to apertures 126 formed in the bracket 122.

The first lock plate 116 may include a main body 132, a series of lock posts 134, a pair of spring seats 136, and an aperture 138 extending through the main body 132. The main body 132 may be at least partially disposed between the bracket 122 and the housing 124 generally within the recess 128 of the bracket 122 and may include the aperture 138 at a distal end thereof. The aperture 138 may be positioned such that at least a portion of the aperture 138 extends above the top surface 130 of the housing 124. The spring seats 136 are disposed within the recess 128 generally between the bracket 122 and the housing 124 and each may receive a biasing member 140 thereon. The biasing member 140 is received within each spring seat 136 and extends between an interior surface of the housing 124 and each spring seat 136 to bias the first lock plate 116 toward the bracket 122 and away from the housing 124.

The lock posts 134 are disposed at an opposite end of the main body 132 than the aperture 138 and extend through a bottom 142 of the bracket 122. The lock posts 134 may extend through individual apertures (not shown) formed through the bottom 142 of the bracket 122 or, alternatively, could extend through a common slot (not shown) formed through the bottom 142 of the bracket 122. Each lock post 134 may include a tapered edge 144 formed on each side of the lock post 134.

The second lock plate 118 may include a main body 146, a series of lock posts 148, a pair of spring seats 150, and an aperture 152 extending through the main body 146. The main body 146 may be at least partially disposed between the bracket 122 and the housing 124 generally within the recess 128 of the bracket 122 and may include the aperture 152 at a distal end thereof. The aperture 152 may be positioned such that at least a portion of the aperture 152 extends above the top surface 130 of the housing 124. The spring seats 150 are disposed within the recess 128 generally between the bracket 122 and the housing 124 and each may receive a biasing member 154 thereon. The biasing member 154 is received within each spring seat 150 and extends between an interior surface of the housing 124 and each spring seat 150 to bias the second lock plate 118 toward the bracket 122 and away from the housing 124.

The lock posts 148 are disposed at an opposite end of the main body 146 than the aperture 152 and extend through the bottom 142 of the bracket 122. The lock posts 148 may extend through individual apertures (not shown) formed through the bottom 142 of the bracket 122 or, alternatively, could extend through a common slot (not shown) formed through the bottom 142 of the bracket 122. Each lock post 148 may include a tapered edge 156 formed on each side of the lock posts 148.

The third lock plate 120 may include a main body 158, a series of lock posts 160, a pair of spring seats 162, and an aperture 164 extending through the main body 158. The main body 158 may be at least partially disposed between the bracket 122 and the housing 124 generally within the recess 128 of the bracket 122 and may include the aperture 164 at a distal end thereof. The aperture 164 may be positioned such that at least a portion of the aperture 164 extends above the top surface 130 of the housing 124. The spring seats 162 are disposed within the recess 128 generally between the bracket 122 and the housing 124 and each may receive a biasing member 166 thereon. The biasing member 166 is received within each spring seat 162 and extends between an interior surface of the housing 124 and each spring seat 162 to bias the third lock plate 120 toward the bracket 122 and away from the housing 124.

The lock posts 160 are disposed at an opposite end of the main body 158 than the aperture 164 and extend through the bottom 142 of the bracket 122. The lock posts 160 may extend through individual apertures (not shown) formed through the bottom 142 of the bracket 122 or, alternatively, could extend through a common slot (not shown) formed through the bottom 142 of the bracket 122. Each lock post 160 may include a tapered edge 168 formed on each side of the lock posts 160.

As described above, the user may actuate an actuation mechanism to move the first lock plate 116, second lock plate 118, and third lock plate 120 into disengaged positions against the force imparted on each lock plate 116, 118, 120 by the respective biasing members 140, 154, 166. This causes the particular combination of lock posts 134, 148, 160 to move out of engagement with the apertures 84, thereby moving the lock mechanism 114 into the unlocked state. Moving the lock mechanism 114 into the unlocked state permits the slide mechanisms 12 and, thus, the seat assembly 2, to move relative to the track 11. Once a desired position of the slide mechanisms 12 and seat assembly 2 relative to the track 11 is obtained, the actuation mechanism may be released, whereby at least one of the first lock plate 116, second lock plate 118, and third lock plate 120 are allowed to drop back into the apertures 84 of the track 11 to prevent further movement of the slide mechanism 12 relative to the track 11.

Because the first lock plate 116, second lock plate 118, and third lock plate 120 are independently movable relative to one another and, further, because the series of lock posts 134, 148, 160 are staggered relative to one another, at least one of the series of lock posts 134, 148, 160 of the first lock plate 116, second lock plate 118, and third lock plate 120 will be aligned with the apertures 84 of the track 11 upon release of the actuation mechanism to allow the lock posts 134, 148, 160 to engage the apertures 84 and prevent movement of the slide mechanisms 12 and, thus, the seat assembly relative to the track 11.

As described, the lock posts 134, 148, 160 of the respective lock plates 116, 118, 120 may occupy particular portions of the apertures 84 or may be aligned with the webs 86 depending on the particular position of the slide mechanism 12 relative to the track 11. Offsetting the lock posts 134, 148, 160 of the lock plates 116, 118, 120 allows the lock posts 134, 148, 160 engaged within the same apertures 84 of the track 11 to contact opposite sides of the aperture 84. The lock posts 134 of the first lock plate 116 may contact the first edge 85 of the apertures 84 and the lock posts 148 of the second lock plate 118 may contact the opposite edge 87 of the apertures 84. Allowing the lock posts 134 of the first lock plate 116 to contact a first edge of the apertures 84 and allowing the lock posts 148 of the second lock plate 118 to contact an opposite edge or side of the apertures 84 may restrict even slight movement of the slide mechanisms 12 and seat assembly 2 relative to the track 11, thereby reducing "chuck" and minimizing noise caused by vibration of the seat assembly 2 and vehicle during use.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A track assembly comprising:
   a track defining a first axis and having formed therein a succession of apertures uniformly spaced along a portion of said track;
   a slide mechanism slidably attached to said track for movement relative to said track along said first axis; and
   a lock mechanism mounted to said slide mechanism and operable between a locked state preventing movement of said slide mechanism relative to said track and an unlocked state permitting movement of said slide mechanism relative to said track, said lock mechanism comprising:
   a housing, and
   three lock plates positioned alongside one another in said housing and independently movable along a second axis perpendicular to said first axis between an engaged position and a disengaged position, each of said three lock plates having a plurality of posts correspondingly spaced relative to the spacing of said apertures, the posts of each of said three lock plates being offset in a direction of said first axis relative to the posts of another two of said three lock plates when positioned in said housing, wherein in said engaged position the plurality of posts of a lock plate engage the apertures in said track and in said disengaged position the plurality of posts of a lock plate do not engage the apertures in said track, and further wherein in the locked state of said lock mechanism two of said lock plates are in said engaged position and one of said lock plates is in said disengaged position.

2. The track assembly of claim 1, wherein said lock mechanism further comprises a bias member for independently biasing each of said three lock plates into said engaged position.

3. The track assembly of claim 1, wherein the plurality of posts of a lock plate engage a corresponding plurality of successive apertures in said track when said lock plate is in said engaged position.

4. The track assembly of claim 1, wherein a dimension of each of said posts in the direction of said first axis is less than a dimension of said apertures in the direction of said first axis.

5. The track assembly of claim 4, wherein each of said posts has a front side and a rear side opposite the front side relative to said first axis, and further wherein a distance along said first axis from the front side of a post from a first of said three lock plates to the rear side of an adjoining offset post from a second of said three lock plates is substantially equal to a dimension of each of said apertures in the direction of said first axis.

6. The track assembly of claim 5, wherein in said engaged position, the front side of a post from said first of said three lock plates contacts a front side of an aperture in said track and the rear side of the adjoining offset post from said second of said three lock plates contacts a rear side of said aperture in said track to prevent movement of said slide mechanism relative to said track.

7. The track assembly of claim 1, wherein the locked state of said lock mechanism comprises three different positions consisting of: (i) a first and a third of said three lock plates in said engaged position and a second of said three lock plates in said disengaged position, (ii) said first and said second of said three lock plates in said engaged position and said third of said three lock plates in said disengaged position, and (iii) said second and said third of said three lock plates in said engaged position and said first of said three lock plates in said disengaged position.

8. The track assembly of claim 1, wherein each of said succession of apertures in said track is substantially rectangular-shaped and spaced apart from an adjoining aperture by a web.

9. The track assembly of claim 8, wherein a dimension of each aperture in the direction of said first axis is approximately twice a corresponding dimension of each web.

10. The track assembly of claim 9, wherein a dimension of each post in the direction of said first axis is approximately equal to one-half a corresponding dimension of each aperture.

11. The track assembly of claim 10, wherein each of the posts from a first of said three lock plates is offset in the direction of said first axis relative to an adjacent post from a second of said three lock plates by an amount equal to a dimension of each of said posts of said three lock plates in the direction of said first axis.

12. The track assembly of claim 11, wherein each of the posts from said second of said three lock plates is offset in the direction of said first axis relative to an adjacent post from a third of said three lock plates by an amount equal to said dimension of each of said posts of said three lock plates in the direction of said first axis.

13. The track assembly of claim 2, wherein the plurality of posts from the lock plates in said engaged position only engage the apertures in said track.

14. The track assembly of claim 3, wherein said bias member comprises a leaf spring having three spring fingers each of which engage one of said three lock plates.

* * * * *

UNITED STATES PATENT AND TRADEMARK OFFICE
CERTIFICATE OF CORRECTION

PATENT NO. : 8,870,147 B2
APPLICATION NO. : 13/166160
DATED : October 28, 2014
INVENTOR(S) : Andrew J. Simms et al.

Page 1 of 1

It is certified that error appears in the above-identified patent and that said Letters Patent is hereby corrected as shown below:

In the claims

Column 13,

Line 1 (Claim 13), "claim 2," should be -- claim 1, --.

Line 4 (Claim 14), "claim 3," should be -- claim 2, --.

Signed and Sealed this
Third Day of November, 2015

Michelle K. Lee
*Director of the United States Patent and Trademark Office*